United States Patent [19]

Morita et al.

[11] Patent Number: 4,836,324

[45] Date of Patent: Jun. 6, 1989

[54] SADDLE TYPE VEHICLE RUNNING ON UNEVEN GROUND

[75] Inventors: Masataka Morita, Hamamatsu; Masao Ishihara, Innasa; Mitsuru Tachikawa, Hamamatsu, all of Japan

[73] Assignee: Suzuki Motor Co., Ltd., Japan

[21] Appl. No.: 195,452

[22] Filed: May 12, 1988

Related U.S. Application Data

[63] Continuation of Ser. No. 934,174, Nov. 20, 1986, abandoned.

[30] Foreign Application Priority Data

Nov. 27, 1985 [JP] Japan ................................ 60-266618
Jan. 21, 1986 [JP] Japan ................................ 61-10740

[51] Int. Cl.⁴ .............................................. B60K 5/00
[52] U.S. Cl. ....................................... 180/291; 180/58; 180/215; 180/312; 180/908
[58] Field of Search ............... 180/215, 217, 227, 228, 180/230, 252, 264, 265, 58, 291, 297, 311, 312, 908; 280/781

[56] References Cited

U.S. PATENT DOCUMENTS

| | | | |
|---|---|---|---|
| 4,169,512 | 10/1979 | Ishikawa | 180/227 |
| 4,374,549 | 2/1983 | Lacroix | 180/227 |
| 4,412,597 | 11/1983 | Aiba | 180/228 |
| 4,453,616 | 6/1984 | Porter | 180/215 |
| 4,487,285 | 12/1984 | Tomita | 180/228 |
| 4,535,869 | 8/1985 | Tsutsumikoshi | 180/215 |
| 4,596,301 | 6/1986 | Nagashima | 180/215 |
| 4,650,210 | 3/1987 | Hirode | 180/215 |

FOREIGN PATENT DOCUMENTS

| | | | |
|---|---|---|---|
| 504508 | 12/1954 | Italy | 180/228 |
| 585620 | 2/1947 | United Kingdom | 180/230 |

*Primary Examiner*—Charles A. Marmor
*Assistant Examiner*—Everett G. Diederiks, Jr.
*Attorney, Agent, or Firm*—McGlew & Tuttle

[57] ABSTRACT

A saddle type vehicle for running on an uneven ground includes a swing type engine unit whose pivot is positioned before a center of the wheel base of the vehicle. The vehicle includes a lower member disposed opposite to a lower surface of the engine unit and includes a frame connected by coupling the lower member and an upper member by a bridge member surrounding a main portion of the engine unit.

7 Claims, 5 Drawing Sheets

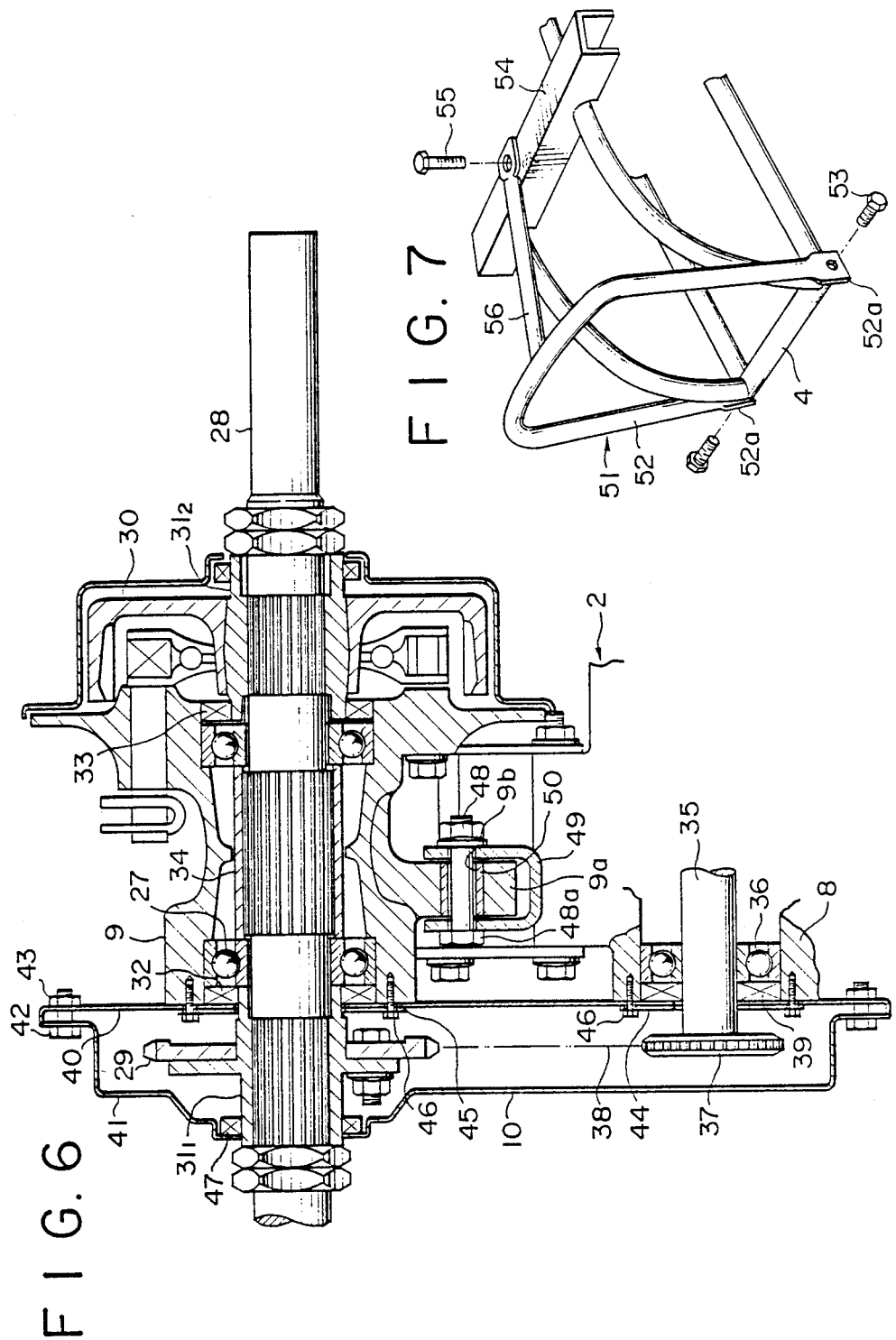

SADDLE TYPE VEHICLE RUNNING ON UNEVEN GROUND

This application is a continuation, of application Ser. No. 934,174, filed Nov. 20, 1986, now abandoned.

BACKGROUND OF THE INVENTION (i) Field of the Invention

The present invention relates to a saddle type vehicle for running on uneven ground.

(ii) Description of the Prior Art

Small motorcycles use a mechanism in which an engine case is structured in a swing type manner. It is structured that a front end of the engine case is supported by a frame and a rear end of the engine case supports a rear axle. The engine case is supported and connected to the frame through buffer means such as a shock absorber.

When the saddle type vehicle for running on an uneven ground adopts the mechanism in which the engine case is structured in the swing type, the engine is susceptible to damage since the engine is not protected by the frame. When the vehicle runs on the uneven ground, it is necessary to protect a lower side of the engine.

Further, when the swing type engine unit is mounted in the vehicle, since the engine unit is disposed at the rear portion of the vehicle body, the weight allotment ratio for the front and rear wheels in one-sided so that a larger weight is born on the rear wheel as compared with the front wheel.

Accordingly, when such a mechanism is adopted in the vehicle for running on the uneven ground such as a four-wheeled vehicle of the saddle type, the control performance of the vehicle is deteriorated.

SUMMARY OF THE INVENTION

It is an object of the present invention to solve the above problems and to provide a saddle type vehicle for running on an uneven ground in which the control performance thereof is improved.

Further, it is another object of the present invention to provide a saddle type vehicle in which damage to an engine in running over uneven ground is prevented.

In order to solve the above problem, the present invention provides a saddle type vehicle for running over uneven ground comprising a swing type engine unit having a pivotal mounting positioned before a center of the wheel base of the vehicle.

Further, the saddle type vehicle, in accordance with the present invention, includes a lower member disposed opposite to a lower surface of the engine unit and a frame structured by coupled between the lower member and an upper member by a bridge member surrounding a main portion of the engine unit.

According to the saddle type vehicle for running on the uneven ground constructed above, since the pivot of the engine unit is disposed before the center of the wheel center, the wheel base can be shortened and the minimum diameter of rotation is improved. Further, since the weight allotment ratio of the front wheel can be larger than that of the rear wheel, the handling operation at a slow speed is easy and the controllability of the vehicle and the stability of the vehicle body can be improved.

Since the frame of the vehicle is structured so that a lower tube is disposed opposite to a lower surface of the engine unit and the main portion of the engine unit is protected by a bridge tube, the main portion of the engine unit can be prevented from being damaged by stones when running on the uneven ground.

BRIEF DESCRIPTION OF THE DRAWINGS

FIGS. 1 and 2 show a saddle type vehicle for running on an uneven ground according to an embodiment of the present invention, in which FIG. 1 is a side view thereof and FIG. 2 is a plan view thereof;

FIGS. 3 and 4 show an enlarged pivot portion of FIG. 1, in which FIG. 3 is a cross-sectional view taken along line A—A of FIG. 1 and FIG. 4 is a side view of FIG. 3;

FIG. 6 is a cross-sectional view showing an embodiment of an axle housing and a chain case; and FIG. 7 is a perspective view of a front bumper.

DETAIL OF THE INVENTION

The present invention is now described in detail with reference to the illustrated embodiment applied to a saddle type vehicle for running on an uneven ground.

Figure 1:
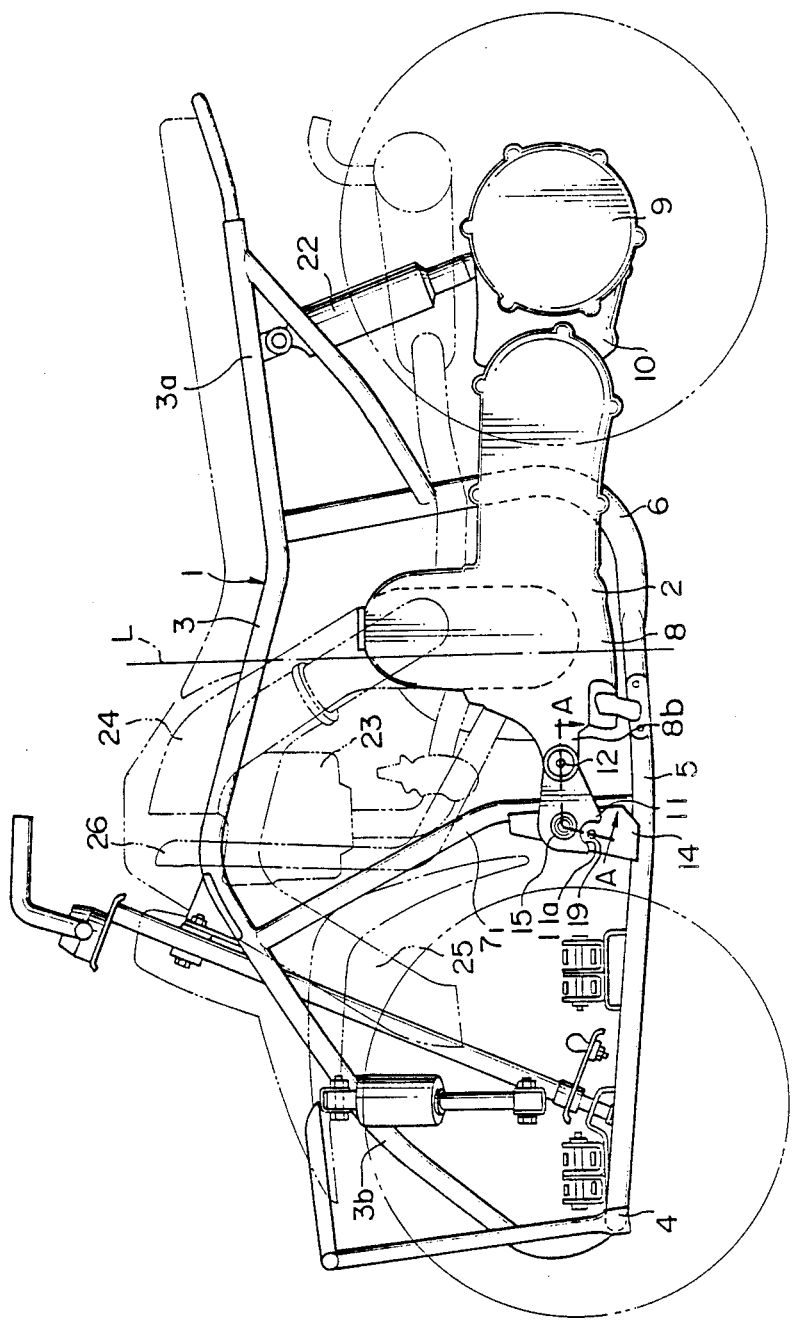
Figure 2:
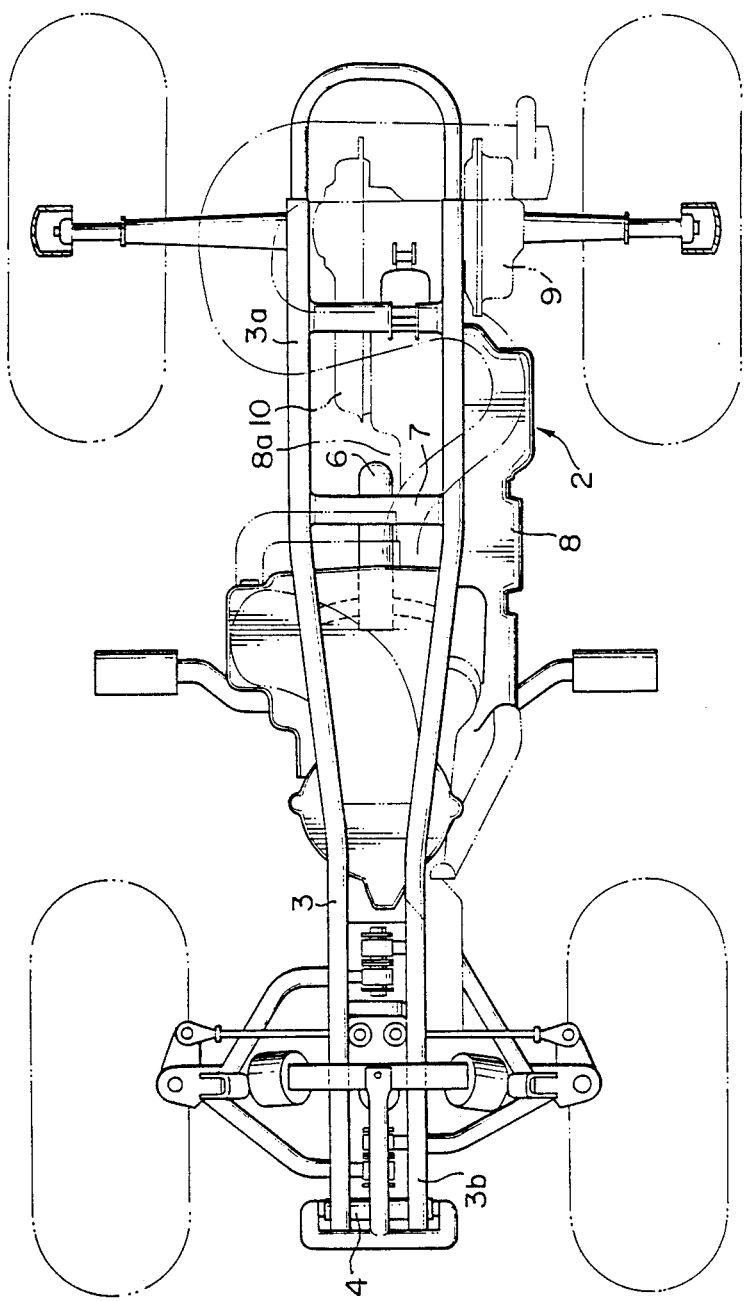
Figure 3:
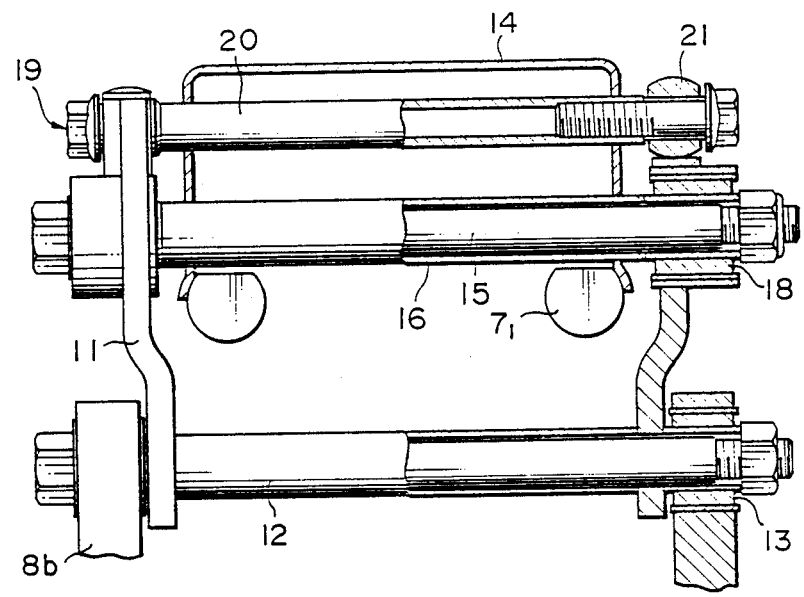
Figure 4:
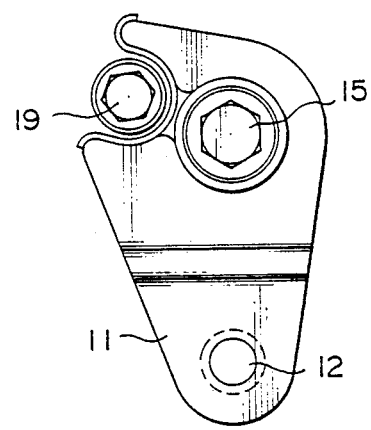
Figure 5:
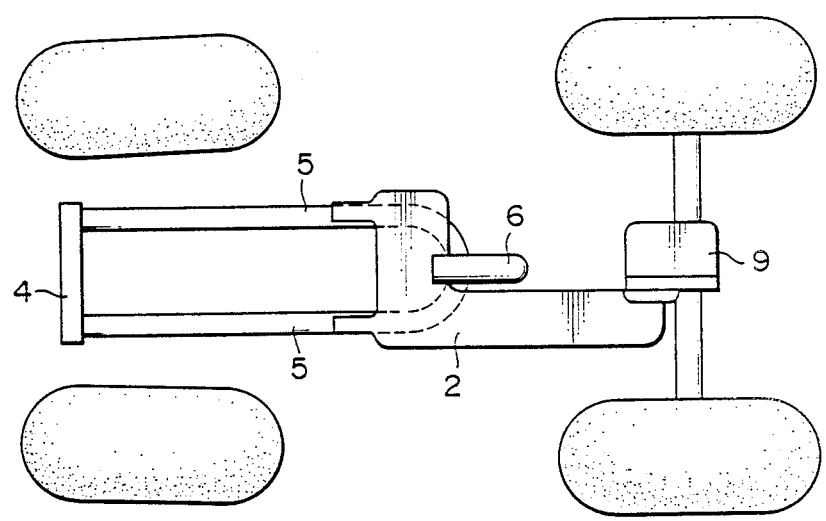
FIG. 5 shows a lower tube of FIG. 2.

In FIGS. 1 and 2, numeral 1 denotes a frame to which a swing type engine unit 2 is mounted. The frame 1 comprises a pair of upper tubes (upper members) 3 including a sheet rail 3a formed integrally at a rear end thereof for putting a sheet thereon and a front portion formed at a front end 3b thereof by bending the front end 3b downward with an angle, a pair of lower tubes (lower members) 5 including a front end coupled with a coupling tube 4 which is coupled with the front end of the pair of upper tubes 3 and a rear end extending opposite to a lower surface of the engine unit while maintaining a fixed space between the lower surface of the engine unit and the lower tubes 5, a bridge tube (bridge member) 6 disposed in a vertical plane containing an axis of the vehicle body and including one end coupled commonly with the rear end of the lower tubes 5 and the other end coupled with the upper tubes 3 by extending the other end upward to surround the main portion of the engine unit 2, and a reinforcement bridge tube 7 disposed between the upper tubes 3 and the lower tubes 5, between the upper tubes 3 and between the lower tubes 5. The engine unit 2 is configured by coupling integrally the engine case 8 and an axle housing 9 of a rear axle by a chain case 10.

The engine case 8 is formed with a recess 8a at a position thereof corresponding to the bridge tube 6 and the bridge tube 6 runs through the recess 8a without prevention by the engine case 8.

A bracket 8b is mounted to a front end of the engine case 8 and is coupled with a crank case bracket 11 through a shaft 12. Numeral 13 denotes a rubber bush for a cushion.

The crank case bracket 11 is rotatably supported through a pivot shaft 15 with a bracket 14 mounted to a bridge tube $7_1$. The pivot shaft 15 is inserted in a sleeve 16 which is supported by penetrating the bracket 14. A mounting 17 of the crank case bracket 11 is tightened together to both sides of the sleeve 16. Numeral 18 denotes a rubber bush for a cushion. Numeral 19 denotes a stopper which is engaged in a notch 11a formed at a lower side of the crank case bracket 11 to limit angular movement of the crank case bracket 11. The stopper 19 is formed of rubber 21 mounted to a shaft 20 which penetrates the bracket 14.

The crank case bracket 11 which is swingably mounted by the pivot shaft 15 is disposed before a center L of the wheel base in which the pivot shaft 15 is positioned.

Numeral 22 denotes a buffer device such as a shock absorber supporting the engine unit 2.

Numeral 23 denotes an air cleaner, 24 an inlet pipe for introducing external air for cooling a cylinder, 25 a pipe for exhausting air after cooling the cylinder and 26 a pipe for introducing air cooling a V belt pulley. Cooling air introduced from the pipe 26 is exhausted through the pipe 25.

FIG. 6 is a cross-sectional view showing an embodiment of the axle housing and the chain case.

The axle housing 9 supports a rear axle 28 through a bearing 27 and is supported to the frame 1 through the buffer device 22.

Numerals 29 and 30 denote a sprocket and a brake drum, respectively, disposed at both sides of the axle housing 9. The sprocket 29 and the brake drum 30 are coupled with the rear axle 28 through splines $31_1$ and $31_2$. Numerals 32 and 33 denote oil seals disposed at inner end peripheries of both openings of the axle housing 9. Numeral 34 denotes a sleeve disposed between the bearings 27.

On the other hand, an ouput shaft 35 of the engine unit 2 is supported to the engine case 8 through a bearing 36. A sprocket 37 mounted to the output shaft 35 is coupled with the sprocket 29 of the rear axle 28 through a chain 38. Numeral 39 denotes an oil seal disposed at an inner end periphery of an opening of the engine case 8.

The chain case 10 comprises an inner cover 40 and an outer cover 41 which are integrally coupled with each other through bolts 42 and nuts 43. Reinforcement plates 44 and 45 are integrally mounted at peripheries of penetrating holes of the inner cover 40 through which the output shaft 35 and the rear axle 28 penetrate and both the plates 44 and 45 are formed with holes (not shown) for fixing the plates. Numeral 46 denotes a screw meshed with the engine case 8 and the axle housing 9 through the holes of the plates 44 and 45. Numeral 47 denotes an oil seal disposed at an inner end periphery of an opening of the outer cover 41.

The buffer device 22 is fixed at its lower metal fitting 49 to a boss 9a of the axle housing 9 through a bolt 48 and a nut 48a. Numeral 50 denotes a rubber bush disposed between a mounting hole 9b of the boss 9a and the bolt 48.

A front bumper 51 provided in order to protect the front portion includes a pipe 52 in the form of a reverse letter of U as shown in FIG. 7, both ends 52a of the pipe 52 being tightly attached to both ends of the pipe 4 through bolts 53 and the U-shaped portion of the pipe 52 being welded to an end of a pipe 56 which is mounted to a suspension bracket 54 by a bolt 55.

What is claimed is:

1. A saddle type vehicle for running on uneven ground, comprising a frame having a front and rear end and including, a swing-type engine drive unit, a right upper member and left upper member each having a downwardly extending front end part, a right lower member and a left lower member, each lower member being connected to corresponding upper members at the lower ends of said right and left upper members, said right and left lower members being connected together by a bridge member connecting said right and left lower members at their rear ends at a connection point approximate a longitudinal central axis of the vehicle, said bridge member including an upward arm being connected to said right and left upper members, a pair of right and left rear wheels, said engine drive unit including an engine case having a drive shaft connected to drive an axle housing portion for the rear wheels of said vehicle and a chain case for accommodating a drive between said engine shaft and said axle housing, said engine drive unit including an end pivotally mounted on said right and left lower members of said frame, said end having a bracket thereon on said engine case pivotally supported on said right and left lower member of said frame at a location forward of the center of the wheel base, said engine drive unit having a recess formed adjacent said bridge member, allowing said bridge member to extend from said right and left lower members to said right and left upper members, said engine drive unit having a lower surface disposed opposite said right and left lower members, an output shaft of said engine drive unit being positioned rearwardly of said recess of said engine drive unit for driving said rear wheels, and a shock absorber connected to said right and left upper members pivotally supporting said axle housing on said frame.

2. A saddle type vehicle according to claim 1: wherein a sprocket is provided at a central location of a shaft of said rear wheels, said sprocket being connected to said output shaft of said engine unit through a chain for driving said rear wheels by said output shaft.

3. A saddle type vehicle comprising a support frame having a front and rear end and including a right and left upper frame part each having a downwardly extending front end part, a right and left lower part connected to said upper frame part adjacent the lower end of said upper frame part said left and right lower part being connected together at a rear end proximate a longitudinal central axis of the vehicle and a bridge part connected between the rear end of said lower parts proximate said central axis and the rear end of said upper frame part, front and rear wheels connected to said frame adjacent said front and rear ends, and a rear drive unit including a drive motor and an engine case, a rear wheel shaft axle driven by said motor, an axle housing, a shock absorber connected to said upper frame part pivotally supporting said axle housing on said frame, a chain drive connected between said shaft axle and said motor and a chain case, said drive unit being mounted on the frame at only two axial locations by the engine case having a rear portion connected to the axle housing and a front portion pivotally connected to said support frame by a bracket at a location forward of the wheel base center.

4. A saddle type vehicle according to claim 3, wherein said engine case has one side having a recess, said bridge part extending along said recess.

5. A saddle type vehicle according to claim 3, wherein said front and rear wheels each comprise wheel sets, said rear wheel set being supported by said rear drive unit.

6. A saddle type vehicle according to claim 3, wherein said bracket constitutes a toggle linkage by having opposite ends connected for pivotal movement to the front portion of said drive unit and to said lower frame, respectively, thereby to effect said pivotal connection of the front portion of the drive unit to the support frame, whereby vibratory movement of the front part of the drive unit along two perpendicular axis is accommodated.

7. A saddle type vehicle according to claim 6 wherein a pair of frame tubes extend between the respective right and left upper and lower frame parts and the pivotal connection to the lower frame is effected through a further bracket fixed to both tubes.

* * * * *